United States Patent
Na et al.

(10) Patent No.: US 7,247,980 B2
(45) Date of Patent: Jul. 24, 2007

(54) EMITTER COMPOSITION USING DIAMOND, METHOD OF MANUFACTURING THE SAME AND FIELD EMISSION CELL USING THE SAME

(75) Inventors: Yang Woon Na, Bucheon-si (KR); Gwang Bae Kim, Seoul (KR)

(73) Assignee: Iljin Idamond Co., Ltd, Seoul (KR)

( * ) Notice: Subject to any disclaimer, the term of this patent is extended or adjusted under 35 U.S.C. 154(b) by 328 days.

(21) Appl. No.: 10/813,943

(22) Filed: Mar. 30, 2004

(65) Prior Publication Data
US 2004/0178713 A1    Sep. 16, 2004

(30) Foreign Application Priority Data
Aug. 4, 2003    (KR) .............. 10-2003-0053785

(51) Int. Cl.
*H01J 1/62*    (2006.01)
(52) U.S. Cl. .............. 313/495; 313/336; 313/351; 313/310; 445/50; 445/51; 252/502; 252/510; 252/511
(58) Field of Classification Search ........ 313/495–497, 313/336, 351, 309, 310; 445/50, 51; 252/502, 252/510, 511; 438/20
See application file for complete search history.

(56) References Cited

U.S. PATENT DOCUMENTS

| | | | |
|---|---|---|---|
| 6,307,323 B1 * | 10/2001 | Song et al. .............. 315/169.1 |
| 6,359,383 B1 | 3/2002 | Chuang et al. |
| 6,409,567 B1 | 6/2002 | Amey, Jr. et al. |
| 6,448,709 B1 | 9/2002 | Chuang et al. |
| 2001/0006232 A1 * | 7/2001 | Choi et al. .............. 257/10 |
| 2001/0024078 A1 * | 9/2001 | Dimitrijevic et al. ....... 313/311 |
| 2003/0132393 A1 * | 7/2003 | Dimitrijevic et al. .... 250/423 F |
| 2004/0164665 A1 * | 8/2004 | Sasaki et al. .............. 313/495 |

FOREIGN PATENT DOCUMENTS

| | | |
|---|---|---|
| CN | 1238436 | 8/2003 |
| CN | 1581400 | 2/2005 |
| EP | 1037250 A1 | 3/2000 |
| EP | 1113478 A1 | 12/2000 |
| EP | 2001909291 | 2/2001 |
| EP | 1408525 A1 | 7/2002 |
| EP | 1291891 A2 | 9/2002 |

(Continued)

*Primary Examiner*—Nimesh Patel
*Assistant Examiner*—Anthony Canning
(74) *Attorney, Agent, or Firm*—Schmeiser, Olsen & Watts LLP

(57) ABSTRACT

Disclosed is an emitter composition of a field emission cell that is printed on a cathode substrate of a display to be applied to an electron emission source, including a carbon nanotube, a binder, glass frit, a dispersing agent and an organic solvent, characterized by further having 0.1–20 w % of diamond. Further, a manufacturing method of the emitter composition and a field emission cell using the emitter composition are also provided. In the current invention, since the field emission cell has the carbon nanotube and the diamond distributed simultaneously therein, it has a relatively high current density even at the same driving voltage, thereby improving emitting properties. In addition, the field emission cell is advantageous in terms of superior printability and stable field emission, while reducing various expenses required to operate and repair constitutive parts thereof.

12 Claims, 4 Drawing Sheets

FOREIGN PATENT DOCUMENTS

| | | |
|---|---|---|
| EP | 1505621 A1 | 4/2004 |
| JP | 1998121002 | 4/1998 |
| JP | 2000348599 | 12/2000 |
| JP | 2005056822 | 3/2005 |
| KR | 1020010058775 | 3/2003 |

* cited by examiner

EMITTER COMPOSITION USING DIAMOND, METHOD OF MANUFACTURING THE SAME AND FIELD EMISSION CELL USING THE SAME

BACKGROUND OF THE INVENTION

1. Field of the Invention

The present invention relates, in general, to a field emission cell, which is used as an electron emission source in the state of being printed on a cathode substrate of a display, etc. More specifically, the present invention relates to an emitter composition of a field emission cell, which has a high luminance and a desired emission efficiency even at a low driving voltage by including a carbon nanotube and diamond, a method of manufacturing the same and a field emission cell using the same.

2. Description of the Related Art

In general, a field emission cell, suitable for use in displays, illuminating systems or backlight units, functions to display an image by applying an emitter as an electron emission source with a strong electric field to emit cold electrons, which are then transferred into a vacuum to collide with a fluorescent film to radiate a fluorescent material.

However, the field emission cell is disadvantageous in that gas particles remaining in vacuum collide with the electrons, and thus, are ionized, whereby such gas ions may collide with a micro tip, thus damaging the emission cell. As well, fluorescent particles, which are removed from the fluorescent film, may contaminate the micro tip, and therefore, may shorten a service life of the field emission cell while deteriorating performances thereof.

Thus, there are proposed methods of manufacturing an electron emission source of a field emission cell to be a thick film by using a predetermined amount of carbon nanotube, which are exemplified by a plasma chemical deposition process, a paste process, and an elctrophoresis process.

In particular, according to the paste process, carbon nanotube powders, a binder, glass frit and an organic solvent are mixed to prepare a composition, which is then printed in a uniform thickness on a cathode substrate through a screen printing process, followed by drying in an oven, evenly trimming and then heating by use of a hot burner, thereby obtaining a desired field emission cell.

Accordingly, the above field emission cell has advantages, such as high image quality and uniform emission efficiency. However, when the above field emission cell is applied to a triode type structure having an insulating layer and a gate layer, it has a low current density and a high driving voltage of about 70V, therefore resulting in poor printability, unstable field emission and low emission efficiency.

Although a field emission cell should have a lower driving voltage to economically fabricate end products, such as display panels, the above field emission cell by the paste process is high in a driving voltage due to the use of only the carbon nanotube, and thus, it is practically impossible to fabricate end products at low costs.

SUMMARY OF THE INVENTION

Accordingly, an object of the present invention is to alleviate the problems encountered in the related art and to provide an emitter composition of a field emission cell, which is advantageous in terms of high luminance and uniform emission efficiency even at a low driving voltage by using a carbon nanotube and diamond.

Another object of the present invention is to provide a method of manufacturing such an emitter composition.

Still another object of the present invention is to provide a field emission cell using such an emitter composition.

To achieve the above objects, the prevent invention provides an emitter composition of a field emission cell, including a carbon nanotube, a binder, glass frit, a dispersing agent, and an organic solvent, wherein the emitter composition further includes 0.1–20 wt % of diamond based on a weight thereof.

Further, there is provided a method of manufacturing an emitter composition of a field emission cell, including: placing a carbon nanotube, a binder, glass frit, a dispersing agent, and an organic solvent into a mixer to obtain a first pre-mixture, further adding 0.1–20 wt % of diamond, based on a weight of the composition, to the first pre-mixture, to obtain a second pre-mixture, and stirring the second pre-mixture by use of a stirrer equipped in the mixer for 1–3 hours, to prepare a paste type mixture.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, a detailed description will be given of an emitter composition, a manufacturing method thereof and a field emission cell using the same, according to the present invention.

Based on the present invention, an emitter composition is provided, which includes a carbon nanotube, a binder, glass frit, a dispersing agent, and an organic solvent, characterized by further comprising 0.1–20 wt % of diamond.

In addition, such an emitter composition is manufactured by placing a carbon nanotube, a binder, glass frit, a dispersing agent, and an organic solvent into a mixer to obtain a first pre-mixture, further adding 0.1–20 wt % of diamond, based on a weight of the composition, to the first pre-mixture, to obtain a second pre-mixture, which is then stirred by use of a stirrer equipped in the mixer for 1–3 hours, resulting in a paste composition.

As such, the reason why an amount of diamond added to a field emission cell is limited to 0.1–20 wt % is that the use of diamond less than 0.1 wt % results in insignificant adding effects of diamond, whereas the use of diamond exceeding 20 wt % results in difficult preparation of a printing paste due to the use of relatively large amounts of other additives.

Further, the used diamond is preferably composed of powders each having a size of 6 μm or less to increase mixing properties.

Also, in addition to the diamond used for the emitter composition of the present invention, amorphous diamond or DLC (Diamond-Like Carbon) may be employed.

Figure 4:
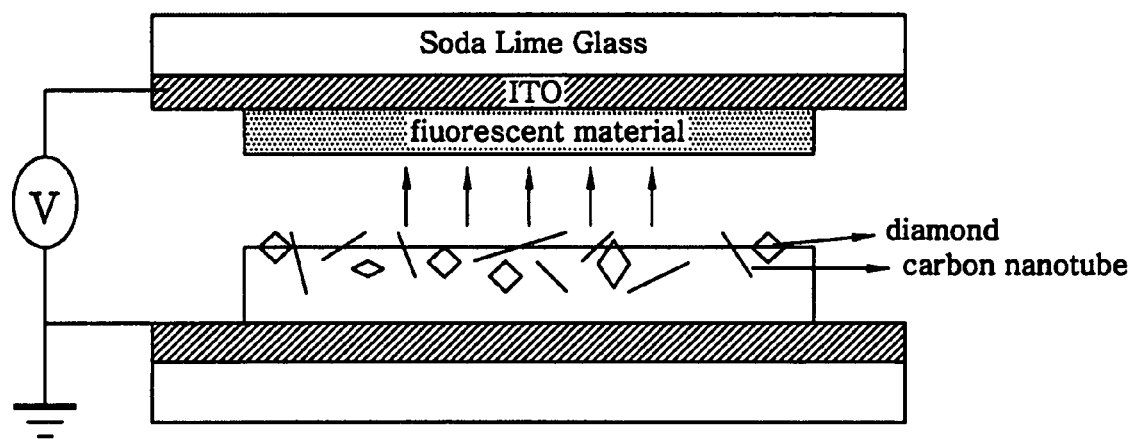
FIG. 4 is a schematic view showing an application of the field emission cell of the present invention.

Meanwhile, upon the fabrication of the field emission cell by printing the composition on a cathode substrate, it is preferred that the paste composition is 1–10 μm thick, and a fluorescent layer is 3–20 μm thick, as shown in FIG. 4.

In the present invention, the carbon nanotube is used in the amount of 2–20 wt %. If the amount of the carbon nanotube is smaller than 2.0 wt %, the field emission cell cannot have a sufficient emitter site, thus decreasing luminance. Whereas, if the amount is larger than 20 wt %, printability becomes poor attributable to the high viscosity of the composition.

The binder is used in the amount of 40–70 wt %. Use of the binder smaller than 40 wt % results in an increased viscosity of the composition, and hence, it is difficult to form a pattern. On the other hand, when the binder exceeding 70 wt % is used, it is difficult to increase the amount of the carbon nanotube to be contained in the paste composition.

As such, the binder is selected from the group consisting of organic carboxylic acids, organic sulfonic acids, esters, inorganic acids and salts thereof, sodium hydrochloric acid, organic acids, and mixtures thereof.

The glass frit and the organic solvent are used in the amounts of 2–20 wt % and 1–5 wt %, respectively. In particular, since the composition resulting from the use of the larger amount of the carbon nanotube has a high viscosity that causes poor printability, the above components act to dissolve the binder, and hence, may reduce the viscosity of the composition.

In such cases, the organic solvent is selected from the group consisting of terpineol (TP), butyl carbitol acetate (BCA), butyl carbitol (BC), and mixtures thereof, and the binder is selected from the group consisting of ethylcellulose, nitrocellulose, or acryl resins.

The dispersing agent functions to increase the dispersion efficiency upon mixing the carbon nanotube or diamond so as to raise a mixture uniformity, and is used in the amount of 1–5 wt %, based on the weight of the composition.

To prepare the paste composition, 2–20 wt % of a carbon nanotube, 40–70 wt % of a binder, 2–20 wt % of glass frit, 1–5 wt % of a dispersing agent, and 1–5 wt % of an organic solvent are introduced into a mixer, to obtain a first pre-mixture.

Subsequently, 0.1–20 wt % of diamond is further added to the first pre-mixture to obtain a second pre-mixture, which is then uniformly mixed at about 500 rpm for 1–3 hours by use of a stirrer equipped in the mixer, resulting in a paste composition.

That is, the paste composition is in the uniformly dispersed state by the dispersing agent upon the stirring process by means of the stirrer. Hence, such a paste composition is utilized to manufacture a field emission cell, through a printing process in a thickness of 1–10 μm.

Thereafter, the paste composition is coated on a cathode substrate of a display, etc., through a screen printing process, to form a thick emitter film, which is then thermally treated to obtain an emitter of a field emission cell containing diamond.

A better understanding of the present invention may be obtained through the following examples which are set forth to illustrate, but are not to be construed as the limit of the present invention.

EXAMPLE 1

A carbon nanotube, a binder, glass frit, a dispersing agent, and an organic solvent were introduced into a mixer equipped with a stirrer, to which diamond was further added, followed by a stirring process, and thus, a paste composition was prepared.

As such, the carbon nanotube and the diamond were used in amounts of about 20 wt % and about 5 wt %, respectively.

Subsequently, the resultant composition was printed on a cathode substrate through a screen printing process to form a thick film of a field emission cell, which was then thermally treated at 330–470° C. for about 1 hour, to manufacture an emitter of a field emission cell.

EXAMPLE 2

An emitter of a field emission cell was manufactured in the same manner as in Example 1, with the exception that the carbon nanotube and the diamond were used in the amounts of about 2 wt % and about 20 wt %, respectively.

EXAMPLE 3

An emitter of a field emission cell was manufactured in the same manner as in Example 1, with the exception that the carbon nanotube and the diamond were used in the amounts of about 10 wt % and about 10 wt %, respectively.

COMPARATIVE EXAMPLE 1

An emitter of a field emission cell was manufactured in the same manner as in Example 1, with the exception that the carbon nanotube was used in the amount of 10 wt %, without the use of the diamond.

COMPARATIVE EXAMPLE 2

An emitter of a field emission cell was manufactured in the same manner as in Example 1, with the exception that the carbon nanotube was used in the amount of 5 wt %, without the use of the diamond.

Figure 1:
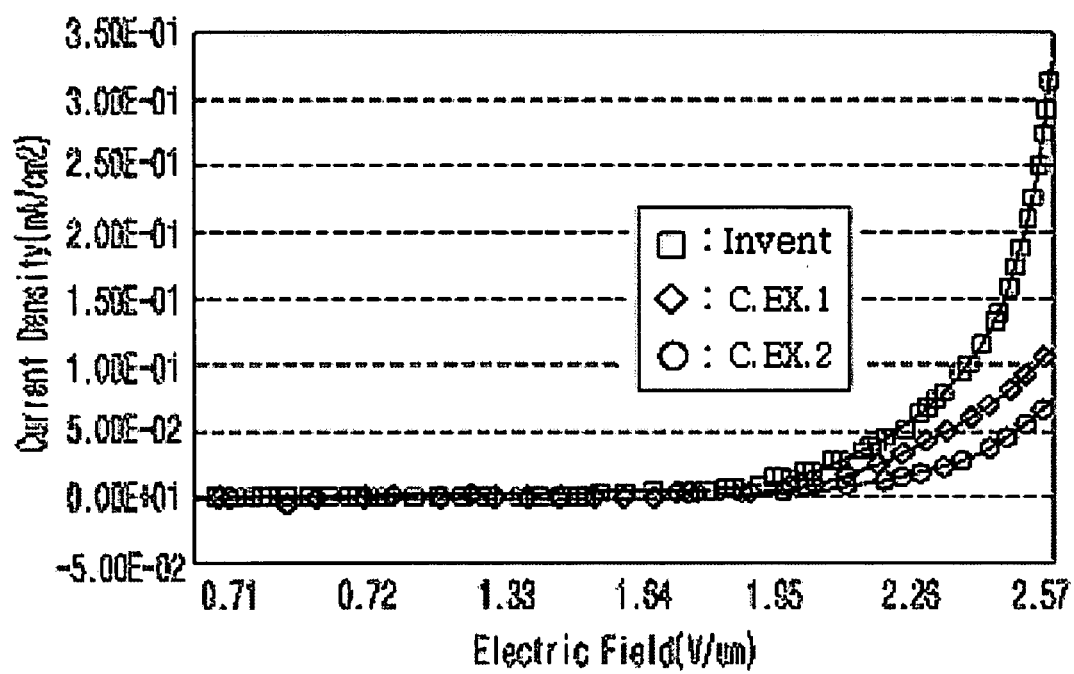
FIG. 1 is a graph showing a current density of a field emission cell of the present invention, compared to that of conventional techniques.

Referring to FIG. 1, there are shown current densities of field emission cells of each of the present invention and comparative examples by the conventional technique. That is, although the field emission cells by the present invention and the comparative examples (1 and 2) have the similar threshold voltage of about 1.2 V/μm, the field emission cell of the present invention including diamond is superior about two to three times in current density as that of the comparative examples.

That is, upon manufacturing the field emission cell, a predetermined amount of diamond is further contained, thereby obtaining a relatively low driving voltage. Eventually, the inventive field emission cell has a high field emission capacity at the same voltage, with superior printability.

Figure 2:
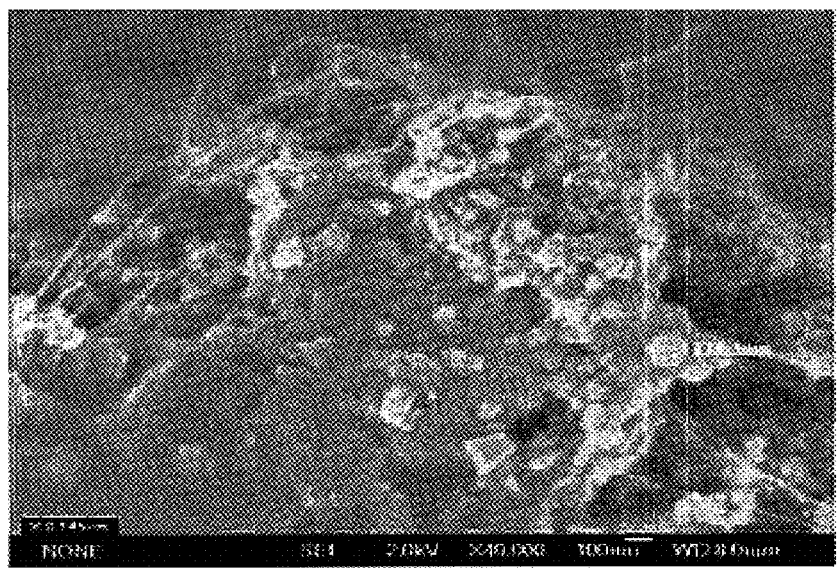
FIG. 2 is a SEM (Scanning Electron Microscope) photograph of the field emission cell of the present invention.

FIG. 2 shows a SEM photograph of the field emission cell of the present invention. As apparent from FIG. 2, it can be seen that the carbon nanotube or diamond is uniformly dispersed in the substrate of the field emission cell.

Figure 3:
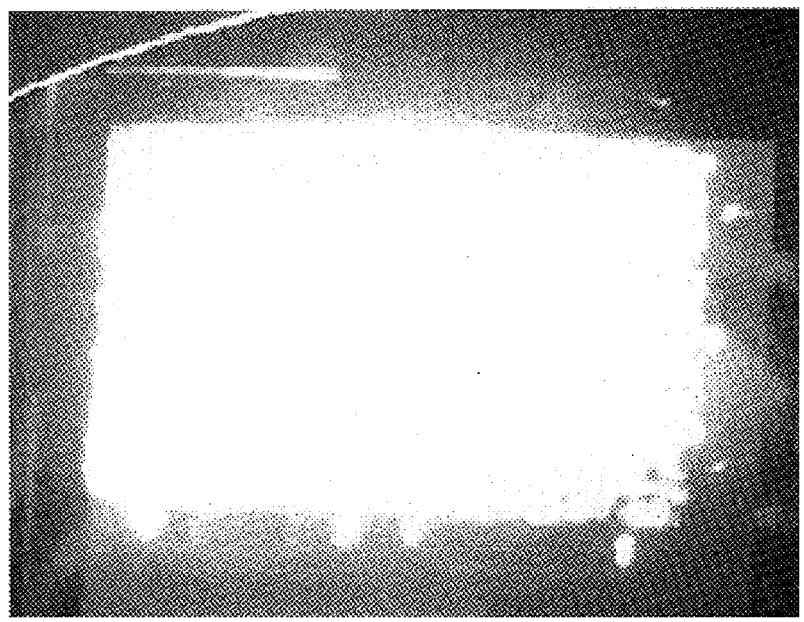
FIG. 3 is a photograph showing an emission image of the field emission cell of the present invention.

Turning now to FIG. 3, there is displayed a field emission image when a voltage of field strength (1.25 kV to 500 μm Gao) of 2.5 V/μm is applied to the field emission cell of the present invention. From this drawing, it can be found that the diamond used in the present invention can function to further increase the field emission capacity of the field emission cell, compared to that of conventional techniques as in the comparative examples 1 and 2.

Additionally, as in FIG. 4, in the cases where the field emission cell of the present invention is applied to a triode type emitter, electronic sources accelerated from the diamond and the carbon nanotube act to hit large quantities of the fluorescent materials, and thus, the quantity of the light to be emitted relatively increases, thereby improving luminance.

As described hereinbefore, the present invention provides an emitter composition of a field emission cell using diamond, a manufacturing method thereof and a field emission cell using the same. In the present invention, the diamond is further contained in the composition of the field emission cell, whereby it can be simultaneously distributed, together with the carbon nanotube, in the substrate of the field emission cell. Thus, the field emission cell has a relatively high current density even at the same driving voltage, thereby improving emitting properties. In addition, the field emission cell is advantageous in terms of superior printability and stable field emission, while reducing a variety of expenses required to operate and repair various constitutive parts thereof.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An emitter paste composition of a field emission cell, comprising 2 wt % to 20 wt % of a carbon nanotube, a binder, glass frit, a dispersing agent, an organic solvent, and 0.1 wt % to 20 wt % of diamond, based on a weight thereof.

2. The emitter paste composition as defined in claim 1, wherein the binder is used in the amount of 40–70 wt %, based on the weight of the composition.

3. The emitter paste composition as defined in claim 1, wherein the glass frit is used in the amount of 2–20 wt %, based on the weight of the composition.

4. The emitter paste composition as defined in claim 1, wherein the dispersing agent is used in the amount of 1–5 wt %, based on the weight of the composition.

5. The emitter paste composition as defined in claim 1, wherein the organic solvent is used in the amount of 1–5 wt %, based on the weight of the composition.

6. The emitter paste composition as defined in claim 1, wherein the organic solvent is selected from the group consisting of terpineol, butyl carbitol acetate, butyl carbitol, and mixtures thereof.

7. The emitter paste composition as defined in claim 2, wherein the organic solvent is selected from the group consisting of terpineol, butyl carbitol acetate, butyl carbitol, and mixtures thereof.

8. The emitter paste composition as defined in claim 3, wherein the organic solvent is selected from the group consisting of terpineol, butyl carbitol acetate, butyl carbitol, and mixtures thereof.

9. The emitter paste composition as defined in claim 4, wherein the organic solvent is selected from the group consisting of terpineol, butyl carbitol acetate, butyl carbitol, and mixtures thereof.

10. The emitter paste composition as defined in claim 5, wherein the organic solvent is selected from the group consisting of terpineol, butyl carbitol acetate, butyl carbitol, and mixtures thereof.

11. The emitter paste composition as defined in claim 1, wherein the diamond comprises powders each having a size not larger than 6 μm.

12. The emitter composition as defined in claim 1, printed to be a thick film in the field emission cell.

* * * * *